United States Patent Office 3,374,051
Patented Mar. 19, 1968

3,374,051
POLYURETHANES MADE FROM DIISOCYANATES OF DIAMINO CARBOXYLIC ACID ESTERS IN LEATHER TREATMENT AND THE SO-TREATED LEATHER
John D. Garber, Allendale, Gordon M. Ide, Morristown, and Frederick M. Meigs, Westfield, N.J., assignors to Merck & Co., Inc., Rahway, N.J., a corporation of New Jersey
No Drawing. Filed Nov. 24, 1964, Ser. No. 413,611
12 Claims. (Cl. 8—94.21)

This invention relates to novel compositions of matter, to novel methods for treating certain materials and to improved materials produced thereby. In one of its specific aspects, the present invention is directed to novel compositions of matter containing certain isocyanate derivatives of certain esters, methods for treating leather therewith for improving the leather and to novel and improved leather produced by said treatment.

In the course of our experimentations, we have discovered that leather could be significantly improved by treating same with isocyanate terminated adducts produced by reacting a mixture of Reactant A which is one or a combination of two or more diisocyanate esters within generic Formula I:

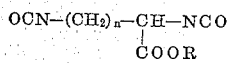

wherein $n$ is selected from the group consisting of 3 and 4; and R is an alkyl radical of 8–20 carbon atoms, and Reactant B which is one or a combination of two or more polyols having at least 2 hydroxyl groups per molecule and containing no other functional groups which will react at any significant rate with Reactant A at 25°–80° C. and with the NCO/OH ratio in said mixture being in the range of 1.3 to 2.0. Reactant B is further characterized as having an average molecular weight of at least 700 and an average number of carbon atoms at least 15 times the number of hydroxyl groups therein. Examples of some of said polyols are hydroxy terminated polyesters, hydroxy terminated polyethers and other aliphatic alcohols as before qualified.

Some specific examples of said polyols are those sold under the trade name "Niax Triol," "Niax Diol," etc., which are available on the market and which are mixtures of hydroxy terminated polyols; castor oil; hydroxy terminated polyesters which may be derived from such materials as the so called "Dimer Acids" available on the market. Such so called "Dimer Acids" are produced by polymerizing unsaturated fatty acids at mid-molecule and are dibasic acids of high molecular weight and having relatively long alkyl chains between their carboxyl groups. Said "Dimer Acids" are known as "Empol Dimer Acids" and also as "Emery 3889-R Dimer Acid," described in Technical Bulletin No. 418B of Emery Industries, Inc., Organic Chemicals Division, November 1961, and Data Sheet No. 2 of Feb. 22, 1963, Research Department of Emery Industries Inc. Also the methods for producing hydroxy terminated polyesters are disclosed in bulletin No. 27 of Aug. 16, 1961, Development and Services Department of Emery Industries, Inc., The diisocyanates within generic Formula I are prepared by esterifying in the presence of p-toluene sulfonic acid catalyst, ornithine and lysine with an alcohol R—OH with R being as before defined. The esters are then separated from the remainder of the reaction masses as p-toluene sulfonates thereof which are then converted into their free bases by running solutions of the salts through a strongly basic anion exchange resin, such as "Dowex 1–X2" which is a strongly basic anion exchange resin having a styrene-divinyl benzene polymer matrix and containing quaternary ammonium groups. It has an average particle size in the range of 50–100 mesh. (See page 1576, 7th edition, Merck Index, Merck & Co., Inc., Rahway, N.J.) The eluate is acidified with HCl gas and concentrated in vacuo and the ester-dihydrochloride is then precipitated out, washed, dried and phosgenated in a medium, such as o-dichlorobenzene after which the o-dichlorobenzene is stripped off under vacuum and the reaction mass is subjected to vacuum distillation and fraction cuts of the diisocyanates produced are recovered. Said diisocyanates employed as reactants herein and the methods for producing them are described in our copending patent application 285,888, filed June 6, 1963, now Patent No. 3,281,378, issued October 1963 and is hereby made part hereof.

I have discovered that the "break," "temper" or scuff resistance of leather could be considerably improved by treating same with said isocyanate terminated adducts without seriously adversely affecting said other qualities thereof. I further discovered that, depending upon the polyol, Reactant B, employed in the production of said adducts, the scuff resistance and/or "break" of the leather could be improved without seriously adversely affecting the "temper" thereof and in some instance at least 2 of said characteristics were improved and in others all three were improved.

Said isocyanate terminated adducts may be applied to leather from solutions thereof, but according to one of the specific aspects of this invention, it is preferable that they be applied from aqueous emulsions thereof whereby unexpectedly better results were achieved, while simultaneously eliminating the use of organic solvents and thereby reducing cost, obviating flammability and/or toxicity, either one or both of which are inherently present when organic solvents are used. I discovered that when aqueous emulsions of said isocyanate terminated adducts were compared with said adducts in organic solvents in the treatment of leather, the temper of the leather treated with the emulsions was superior to that of the leather treated with the solutions.

An object of the invention is to improve leather by treating same with isocyanate terminated adducts.

Another object of the invention is to improve leather by treating same with an aqueous emulsion of said isocyanate terminated adducts.

Another object of the invention is to provide aqueous emulsions of said adducts, finding especial utility for treating leather.

Another object of the invention is to provide novel marketable composition of matter, each comprising at least one of said adducts and at least one agent, which is substantially non-reactable therewith under normal conditions of storage and transportation and when said composition of matter is vigorously stirred an aqueous medium serves as an emulsifying agent.

These as well as other objects and advantages of the present invention will at least in part be readily apparent from the following description.

For practicing the methods of the present invention to provide improved leather, the following procedure was employed in the production of the isocyanate terminated adducts to be used.

A quantity of Reactant A and a quantity of Reactant B were mixed together in a vessel, inert with respect to said reactants and the end product to be produced, to provide a mixture having a NCO/OH ratio of about 1.3 to about 2. Then while being constantly stirred and maintained under a nitrogen blanket, the mixture was heated to and maintained in the temperature range of 70°–80° C. for 4 hours whereby completion of reaction occurred and the desired substantially anhydrous isocyanate adduct was produced in practically theoretical yields.

Then the emulsions were made in the following manner: Into an operating Waring Blendor containing 80 parts by weight of deionized water and 0.1 part by weight of an emulsifying agent was slowly added 20 parts by weight of an isocyanate adduct as before produced whereby an aqueous emulsion was formed.

The grain side of the leather was then treated with said freshly prepared emulsions in the following manner and subsequently tested for "temper," "break" and scuff resistance. In each instance a piece of tanned, buffed unfinished leather measuring 8" x 4" was used, and the grain face thereof was marked with a visible mid-line thereby dividing the surface of the piece into two 4" x 4" squares. Then on to a surface of only one of said squares of leather, which was either wet due to being water soaked or dry, was evenly applied 2 grams of one of said emulsions, freshly prepared, which was absorbed by the wet or dry leather thereby impregnating same. Then the piece was placed in an oven maintained at 40° C. and kept therein for 18 hours. At the end of that time it was removed from the oven and was found to be dry to the touch. It was then subjected to conventional "plating," using a hydraulic press with heated platens, and subsequently aged in a room at 25° C. for 2 days. Then it was subjected to conventional testing procedures whereby the "temper," "break" and scuff resistance of the treated and untreated squares of the piece were compared and the ascertained comparative values were recorded.

The following table shows the comparative "temper" "break" and scuff resistance characteristics of individual respective pieces of leather treated in the manner before described, and employing aqueous emulsions of isocyanate terminated adducts produced by reacting, for the purpose of illustration and not limitation, a mixture of lysine diisocyanate octyl ester with the particular polyols indicated, with the NCO/OH ratio being as indicated, and with the leather being dry, unless otherwise indicated, on to which the particular adduct was applied.

The Reactants B employed and designated as "LHT–112," "LHT–68," "LHT–42" and "LHT–34" are "Niax Triols" and are so designated by the producer and are propylene oxide adducts of hexanetriol and whose average molecular weights are 1500, 2400, 4400 and 5000 respectively. The Reactant B employed and designated as "LG–56" is also a "Niax Triol" and is so designated by the producer and is a propylene oxide adduct of glycerine and has an average molecular weight of 3000.

The emulsifying agent used in the preparation of the emulsions used in the treatment of "Leather Nos." 1–14 and 24 was "Triton X–100" and is emulsifying agent consisting essentially of ethylene oxide adduct of t-octyl phenol and having an average of 9–10 ethylene oxide moieties. Sodium lauryl sulfate was the emulsifying agent used in the preparation of the emulsions used in treating "Leathers Nos." 15 and 16. The emulsifying agent used in the preparation of the emulsion used in "Leathers Nos." 17 and 18 was "Ivory Snow" which consisted essentially of sodium salts of long chain fatty acids. Emulsifying agent "Triton CF–21" was used in the preparation of the emulsions used in "Leathers Nos." 19 and 20; and emulsifying agent "Triton CF–54" was used in the preparation of the emulsions used in "Leathers Nos." 21–23. The emulsifying agents "Triton CF–21" and "Triton CF–54" are also products of Rohm & Haas, the former being a non-ionic alkylated aryl polyether alcohol and the latter being a non-ionic modified polyethoxy adduct. Emulsifying agent "Igepon T–77" produced by General Aniline & Film was used in the preparation of the emulsion used in "Leather Nos." 25. "Igepon T–77" is sodium N-methyl N-oleo taurate.

In the table of the value of "0" means no change in the particular property between the treated and untreated halves of the individual piece of leather; and the + values mean appreciable improvement while the — values means impairment in the particular property between such treated and untreated halves. A +1 value indicates some improvement and a +2 value means good improvement; and the —1 value means some impairment and a —2 value means appreciable impairment and all — values of numbers less than 3 are not so serious as to be intolerable.

| Leather Nos. | Reactant B | NCO/OH value | Scuff Resistance | Break | Temper |
|---|---|---|---|---|---|
| 1 | Castor Oil | 1.6 | +1 | —1 | —1 |
| 2 | LHT–68 | 1.6 | +1 | 0 | 0 |
| 3 | LHT–68 | 1.8 | +1 | 0 | —1 |
| 4 | LHT–68 | 2.0 | +1 | +1 | —1 |
| 5 | LG–56 | 1.6 | +1 | 0 | 0 |
| 6 | LG–56 | 1.8 | +1 | +1 | —1 |
| 7 | LHT–42 | 1.6 | 0 | 0 | +2 |
| 8 | LHT–42 | 1.8 | +1 | +1 | 0 |
| 9 | LHT–42 | 2.0 | +2 | +1 | 0 |
| 10 | LHT–34 | 1.6 | +1 | 0 | +2 |
| 11 | LHT–34 | 1.8 | +1 | +1 | 0 |
| 12 | LHT–34 | 2.0 | +1 | +1 | +1 |
| 13 | LG–56 | 1.8 | +1 | 0 | 0 |
| 14 (wet) | LG–56 | 1.8 | +2 | +1 | —1 |
| 15 | LG–56 | 1.8 | +2 | +2 | —1 |
| 16 (wet) | LG–56 | 1.8 | +2 | 0 | —1 |
| 17 | LG–56 | 1.8 | +1 | 0 | —1 |
| 18 (wet) | LG–56 | 1.8 | +2 | 0 | +1 |
| 19 | LG–56 | 1.8 | +2 | 0 | +1 |
| 20 (wet) | LG–56 | 1.8 | +2 | 0 | —1 |
| 21 | LG–56 | 1.8 | +1 | 0 | +1 |
| 22 (wet) | LG–56 | 1.8 | +2 | +1 | 0 |
| 23 | LHT–42 | 1.8 | +2 | 0 | +1 |
| 24* | LHT–112 | 1.6 | +1 | 0 | —1 |
| 25 | LG–56 | 1.8 | +1 | +1 | 0 |

*In this instance the emulsion consisted of 10 parts by weight of the isocyanate terminated adduct in 90 parts of water, whereas in 1–23 and 25 the emulsions all consisted of 20 parts of the respective isocyanate adducts in 80 parts of water.

It is also within the purview of this invention to substitute for the Reactant B employed in the specific Examples 1–25, any of the other Reactant B. For example various other polyols or combinations of diols, triols, tetrols, etc., may be used, provided the average molecular weight thereof is at least 700 and the average number of carbon atoms therein is at least 15 times the average number of hydroxyl groups therein; and, also instead of the particular diisocyanate ester used in said examples any one of the other or combination of two or more diisocyanates of Formula I may be used in such mixtures wherein the NCO/OH ratio is in the range of about 1.3 to about 2 for the production of isocyanate terminated adducts which, especially when in aqueous emulsions serve to improve leather when same is treated therewith in the manner heretofore described; and also the amount of said diisocyanate adducts applied per square foot of leather may vary but in general is in the range of about 0.5–7 grams per square foot.

Also, if desired, the proportion of the emulsifying agent may be varied. For most purposes, it is preferred that the emulsifying agent used be water soluble and the ratio of emulsifying agent to the adduct be in the range of 0.2–5 parts by weight of emulsifying agent per 100 parts by weight of said adduct. And, the emulsifying agents used may be any one or combination of two or more of those heretofore set forth or of any other which is substantially non-reactive with said adducts either in the presence or absence of water under the normal conditions of storage, transportation or use. Also instead of producing said aqueous emulsions in the manner heretofore described and selling them as compositions in commerce, it is within the purview of this invention to provide novel substantially anhydrous or moisture free compositions of matter as compositions of commerce which is due to the absence of substantial amounts of water therein are stable for very long periods of time. Said substantially moisture free compositions may be combined with an aqueous medium by the ultimate user to make up emulsions finding application for leather and possibly other uses. These compositions of matter are produced by first cooling under nitrogen to room temperature the adduct produced after reaction of the reactants under nitrogen for 4 hours as heretofore described. This now cooled and substantially anhydrous or moisture free adduct, while still under nitrogen is uniformly mixed with an agent which is in substantially anhydrous condition and free of moisture and which is non-reactable with said adduct under normal conditions of storage, transportation or use and which, when said composition of matter is vigorously stirred in an aqueous medium, serves as an emulsifying agent for said adduct and is non-reactive with said adduct in said aqueous medium under normal conditions of storage, transportation and use. The uniform moisture free mixtures of said adducts and said agents are packed in hermetically sealed containers composed of polyethylene, aluminum or other material which is non-reactive with respect to the adducts and agents therein and which protects said mixtures from moisture and other components of the atmosphere. The so-packaged mixtures are stable for very long periods of time and may be sold in commerce in units of desired weights. When obtained by the purchasers, it is recommended that when the packages are opened the contents be used immediately by pouring into the desired quantity of water and then the mass be subjected to action of a higher speed stirrer to provide emulsions of the adducts in water, with the agents acting as the emulsifier therefor.

It is to be understood, that unless otherwise specifically indicated the expression "a polyol whose average molecular weight is at least 700, whose ratio of the number of carbon atoms to the number of hydroxyl groups herein is at least 15—" as used in the description and/or claims is intended to mean either any specific polyol whose molecular weight is at least 700, whose ratio of the number of carbon atoms to the number of hydroxyl groups therein is at least 15—, or any mixture or combination of polyols, each mixture or combination whose average molecular weight is at least 700 and whose ratio of the number of carbon atoms to the hydroxyl groups therein is at least 15—.

It is also understood that the following claims are intended to cover all the generic and specific features of the invention herein described and all statements of the scope of the invention which as a matter of language might be said to fall therebetween, and that they are intended to be inclusive in scope and not exclusive in that, if desired, other materials may be added to the claimed adducts and without departing from the spirit of the invention. Particularly it is to be understood that in said claims ingredients or components recited in the singular are intended to include mixtures of said ingredients wherever the sense permits.

Since certain changes in carrying out the aforedescribed methods and certain modifications in the articles and compositions of matter which embody the invention may be made without departing from its scope, it is intended that all matter contained in the foregoing description shall be interpreted as illustrative and not in a limiting sense.

We claim:

1. The method for improving leather comprising treating it with an aqueous emulsion of an isocyanate terminated adduct, said adduct produced by reacting a mixture comprising:
   (A) a diisocyanate within generic formula

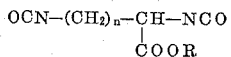

wherein $n$ is selected from the group consisting of 3 and 4; and R is an alkyl radical of 8–20 carbon atoms; and
   (B) a polyol whose average molecular weight is at least 700, whose ratio of the number of carbon atoms to the number of hydroxyl radicals therein is at least 15 and being free of other functional groups which will react to any significant degree with (A) at 25°–80° C.; the NCO/OH ratio in said mixture being in the range of about 1.3 to about 2.0.

2. The method as defined in claim 1, with $n$ being 3.
3. The method as defined in claim 1, with $n$ being 4.
4. The method as defined in claim 1, with R being $C_8H_{17}$.
5. The method as defined in claim 1, with $n$ being 3 and R being $C_8H_{17}$.
6. The method as defined in claim 1, with $n$ being 4 and R being $C_8H_{17}$.
7. Leather impregnated with an isocyanate terminated adduct produced by reacting a mixture comprising (A) a diisocyanate within generic formula

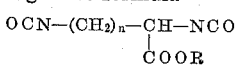

wherein $n$ is selected from the group consisting of 3 and 4; and R is an alkyl radical of 8–20 carbon atoms; and (B) a polyol whose average molecular weight is at least 700, whose ratio of the number of carbon atoms to the number of hydroxyl radicals therein is at least 15 and being free of other functional groups which will react to any significant degree with (A) at 25°–80° C.; the NCO/OH ratio in said mixture being in the range of about 1.3 to about 2.0.

8. Impregnated leather as defined in claim 7, with $n$ being 3.
9. Impregnated leather as defined in claim 7, with $n$ being 4.
10. Impregnated leather as defined in claim 7, with R being $C_8H_{17}$.
11. Impregnated leather as defined in claim 7, with $n$ being 3 and R being $C_8H_{17}$.
12. Impregnated leather as defined in claim 7, with $n$ being 4 and R being $C_8H_{17}$.

References Cited

UNITED STATES PATENTS

| | | | |
|---|---|---|---|
| 3,261,655 | 7/1966 | Neher et al. | 8—94.21 |
| 3,261,656 | 7/1966 | Neher et al. | 8—94.21 |
| 3,261,657 | 7/1966 | Neher et al. | 8—94.21 |
| 3,281,378 | 10/1966 | Garber | 260—478 |

J. TRAVIS BROWN, *Acting Primary Examiner.*
D. LEVY, *Examiner.*